United States Patent
Sperber et al.

(10) Patent No.: US 10,402,263 B2
(45) Date of Patent: Sep. 3, 2019

(54) ACCELERATING MEMORY FAULT RESOLUTION BY PERFORMING FAST RE-FETCHING

(71) Applicant: Intel Corporation, Santa Clara, CA (US)

(72) Inventors: Zeev Sperber, Zichron Yackov (IL); Stanislav Shwartsman, Haifa (IL); Jared W. Stark, IV, Portland, OR (US); Lihu Rappoport, Haifa (IL); Igor Yanover, Yokneam Illit (IL); George Leifman, Haifa (IL)

(73) Assignee: Intel Corporation, Santa Clara, CA (US)

( * ) Notice: Subject to any disclaimer, the term of this patent is extended or adjusted under 35 U.S.C. 154(b) by 87 days.

(21) Appl. No.: 15/831,195

(22) Filed: Dec. 4, 2017

(65) Prior Publication Data

US 2019/0171515 A1 Jun. 6, 2019

(51) Int. Cl.
| | |
|---|---|
| *G06F 11/00* | (2006.01) |
| *G06F 11/07* | (2006.01) |
| *G06F 12/02* | (2006.01) |
| *G06F 9/38* | (2018.01) |
| *G06F 9/30* | (2018.01) |

(52) U.S. Cl.
CPC ...... *G06F 11/0793* (2013.01); *G06F 9/30043* (2013.01); *G06F 9/30058* (2013.01); *G06F 9/3802* (2013.01); *G06F 9/3855* (2013.01); *G06F 11/0721* (2013.01); *G06F 12/0215* (2013.01); *G06F 12/0253* (2013.01); *G06F 2212/654* (2013.01); *G06F 2212/702* (2013.01)

(58) Field of Classification Search
CPC ............ G06F 11/0793; G06F 9/30043; G06F 9/30058; G06F 9/3802; G06F 9/3855; G06F 11/0721; G06F 12/0215; G06F 12/0253; G06F 2212/702; G06F 2212/654
See application file for complete search history.

(56) References Cited

U.S. PATENT DOCUMENTS

| | | | | |
|---|---|---|---|---|
| 5,931,957 | A * | 8/1999 | Konigsburg | ........ G06F 9/30043 712/216 |
| 6,895,527 | B1 * | 5/2005 | Quach | ................. G06F 11/1052 712/244 |
| 6,918,030 | B2 * | 7/2005 | Johnson | ................... G06F 9/383 712/219 |
| 2004/0044881 | A1 * | 3/2004 | Maier | ................... G06F 9/3824 712/218 |

(Continued)

*Primary Examiner* — Jason B Bryan
(74) *Attorney, Agent, or Firm* — Nicholson De Vos Webster & Elliott LLP

(57) ABSTRACT

A method for handling load faults in an out-of-order processor is described. The method includes detecting, by a memory ordering buffer of the out-of-order processor, a load fault corresponding to a load instruction that was executed out-of-order by the out-of-order processor; determining, by the memory ordering buffer, whether instant reclamation is available for resolving the load fault of the load instruction; and performing, in response to determining that instant reclamation is available for resolving the load fault of the load instruction, instant reclamation to re-fetch the load instruction for execution prior to attempting to retire the load instruction.

20 Claims, 13 Drawing Sheets

(56) References Cited

U.S. PATENT DOCUMENTS

| | | | | |
|---|---|---|---|---|
| 2004/0078559 A1* | 4/2004 | Katayama | ............ | G06F 9/3017 |
| | | | | 712/239 |
| 2013/0138931 A1* | 5/2013 | Gunna | ................. | G06F 9/3855 |
| | | | | 712/234 |
| 2017/0286121 A1* | 10/2017 | Hildesheim | ........... | G06F 9/3861 |

* cited by examiner

| LOAD INFORMATION TABLE 130 | | | | |
|---|---|---|---|---|
| $302_1$ | BIT IDENTIFIER $304_1$ | REORDER BUFFER IDENTIFIER $306_1$ | STORE BUFFER IDENTIFIER $308_1$ | LOAD BUFFER IDENTIFIER $310_1$ |
| $302_2$ | BIT IDENTIFIER $304_2$ | REORDER BUFFER IDENTIFIER $306_2$ | STORE BUFFER IDENTIFIER $308_2$ | LOAD BUFFER IDENTIFIER $310_2$ |
| ... | | | | |
| $302_N$ | BIT IDENTIFIER $304_N$ | REORDER BUFFER IDENTIFIER $306_N$ | STORE BUFFER IDENTIFIER $308_N$ | LOAD BUFFER IDENTIFIER $310_N$ |

| LOAD BUFFER 108 | | | LOAD INFORMATION TABLE 130 | | | |
|---|---|---|---|---|---|---|
| LOAD INSTRUCTION 110₁ | INSTANT RECLAMATION FLAG 202₁ | BIT ID 304₁ | ROB ID 306₁ | SB ID 308₁ | LB ID 310₁ |
| LOAD INSTRUCTION 110₂ | INSTANT RECLAMATION FLAG 202₂ | BIT ID 304₂ | ROB ID 306₂ | SB ID 308₂ | LB ID 310₂ |
| ... | ... | ... | ... | ... | ... |
| LOAD INSTRUCTION 110ₙ | INSTANT RECLAMATION FLAG 202ₙ | BIT ID 304ₙ | ROB ID 306ₙ | SB ID 308ₙ | LB ID 310ₙ |

MEMORY ORDERING BUFFER 106

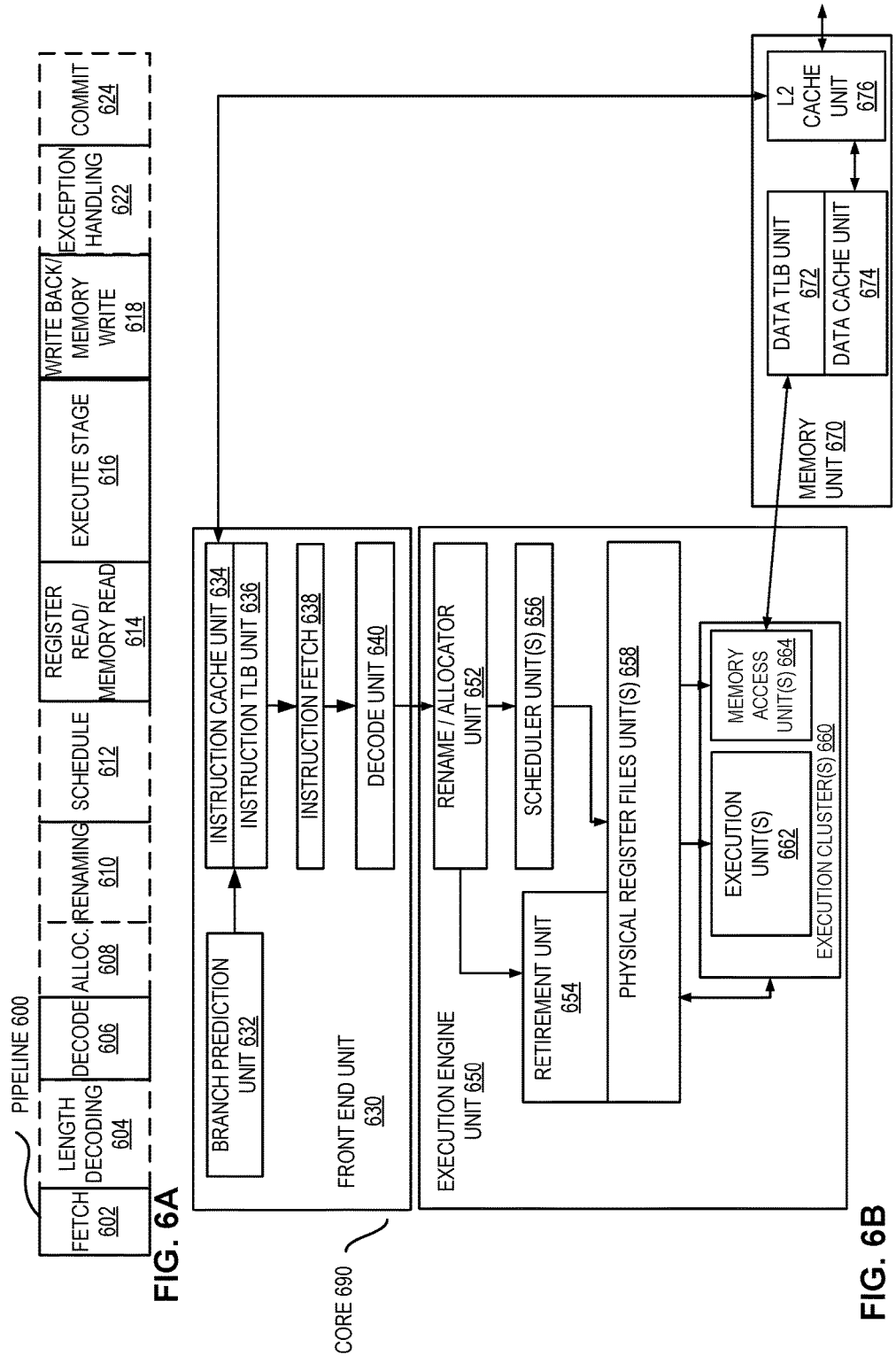

ACCELERATING MEMORY FAULT RESOLUTION BY PERFORMING FAST RE-FETCHING

FIELD OF INVENTION

The field of the invention relates generally to computer processor architectures. More specifically, the field of the invention relates to using instant reclamation to resolve load faults at the time the load fault is detected instead of at the time the faulty load instruction is retired.

BACKGROUND

Out-of-order execution (also known as dynamic execution) of instructions allow instructions to be executed in a processor based on resource availability and not entirely tied to program order. In this fashion, the processor can minimize idle time that occurs while waiting for preceding instructions to complete. This out-of-order execution extends to several types of instructions, including load instructions. For example, a load instruction in a program may be fetched, decoded, and executed before other instructions that precede the load instruction in the original program order. The load instruction will remain in the processor until preceding instructions are executed such that the processor may determine whether the out-of-order load instruction was correctly executed.

Once the out-of-order load instruction is determined to have been properly executed, the load instruction may be retired. However, a load fault may occur to a load instruction at any time between execution and retirement. These load faults may be caused by external snoop hits, memory disambiguation misprediction, memory renaming mismatch, or other similar events.

Normally the above load faults are reported at retirement of the load instruction and are resolved only after a store buffer drain occurs. Namely, a fault is determined after all older instructions have been executed and the out-of-order load instruction is re-executed with up-to-date inputs. Accordingly, when load faults are reported and corrected at retirement, the benefits of out-of-order execution are nullified since at that point all preceding instructions have already executed and the load instruction is now being executed in program order.

In contrast to detection and re-fetched of out-of-order faulted loads, mis-predicted branches implement a scheme called instant reclamation. Instant reclamation allows faults associated with mis-predicted branch instructions to be detected at execution and re-fetched for execution before retirement. However, instant reclamation is not unavailable at this time for load instructions.

BRIEF DESCRIPTION OF THE DRAWINGS

Embodiments of the present invention are illustrated by way of example and not limitation in the figures of the accompanying drawings, in which like references indicate similar elements and in which:

FIG. 3 shows a load information table according to one example embodiment.

FIG. 4 shows a load information table included in a memory ordering buffer according to one example embodiment.

FIG. 6A is a block diagram illustrating both an exemplary in-order pipeline and an exemplary register renaming, out-of-order issue/execution pipeline according to embodiments of the invention.

FIG. 6B is a block diagram illustrating both an exemplary embodiment of an in-order architecture core and an exemplary register renaming, out-of-order issue/execution architecture core to be included in a processor according to embodiments of the invention.

FIG. 7A is a block diagram of a single processor core, along with its connection to the on-die interconnect network and with its local subset of the Level 2 (L2) cache, according to embodiments of the invention.

FIG. 7B is an expanded view of part of the processor core in FIG. 7A according to embodiments of the invention.

FIG. 9 shows a block diagram of a system in accordance with one embodiment of the present invention.

FIG. 10 is a block diagram of a first more specific exemplary system in accordance with an embodiment of the present invention.

FIG. 11 is a block diagram of a second more specific exemplary system in accordance with an embodiment of the present invention.

FIG. 12 is a block diagram of a System-on-a-Chip (SoC) in accordance with an embodiment of the present invention.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Figure 1:
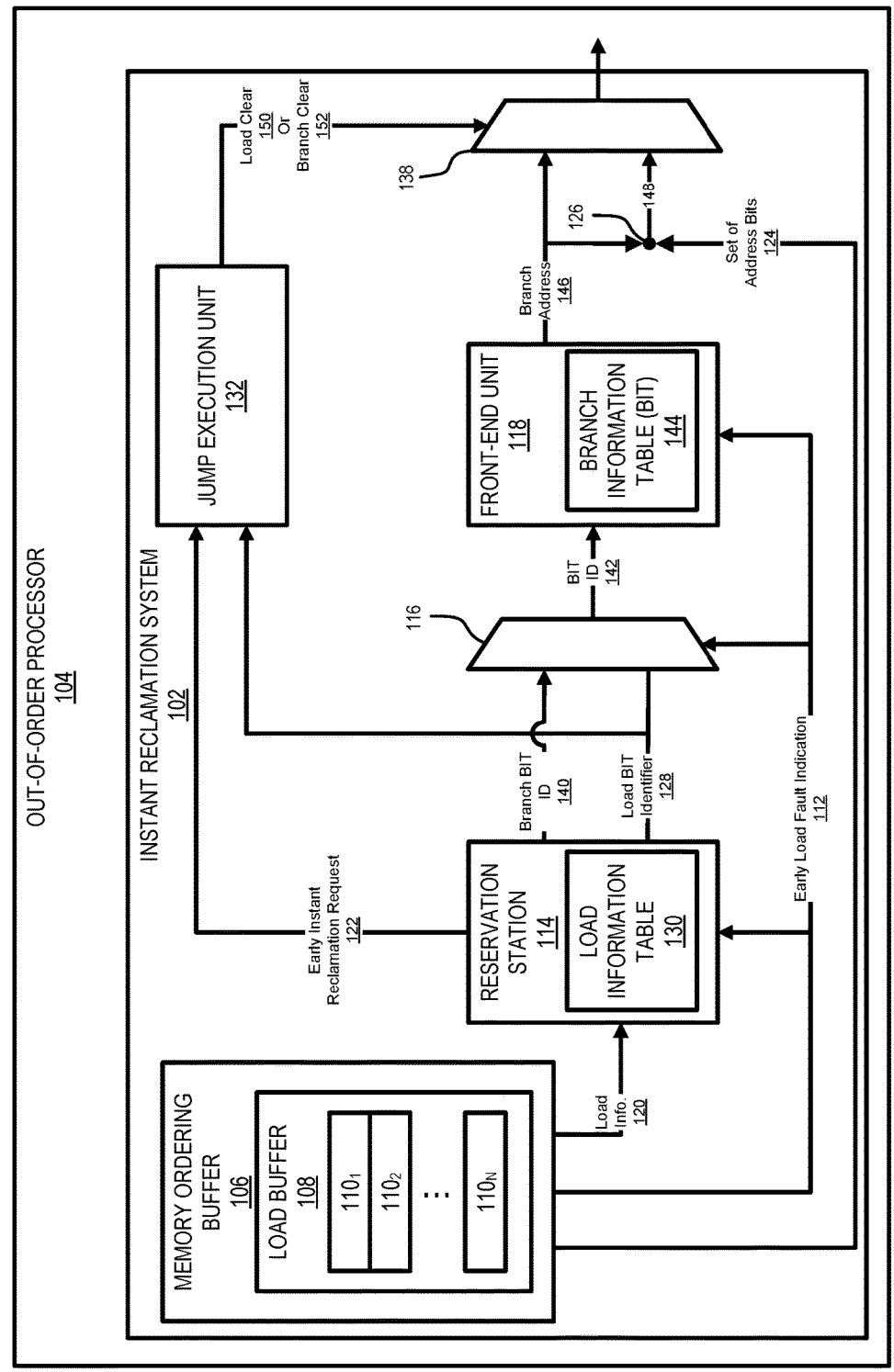
FIG. 1 shows an instant reclamation system that may reside and operate within an out-of-order processor according to one example embodiment.

FIG. 1 shows an instant reclamation system 102 according to one example embodiment that may reside and operate within an out-of-order processor 104. As described herein, the instant reclamation system 102 may handle both mis-predicted branches and faulty load instructions. For example, the instant reclamation system 102 may detect a fault associated with a load instruction, which was previously executed out-of-order but has not yet retired. In comparison to other systems that handle faulty load instructions at retirement (e.g., while the instruction is in a re-order buffer), the instant reclamation system 102 may handle the faulty load instruction as soon as the fault is detected and does not need to wait until retirement of the faulty load instruction. Accordingly, the faulty load instruction may still be re-fetched and re-executed out-of-order, even after detection of the load fault. Thus, performance/efficiency gains from out-of-order execution of load instructions may still be achieved after detection of a load fault. Further, as noted above, the instant reclamation system 102 may be configured to handle mis-predicted branches in addition to faulty load instructions by basing instant reclamation for faulty load instructions on addresses of preceding branch instructions. This dual operation of the instant reclamation system 102 minimizes the footprint within the out-of-order processor 104 needed to handle mis-predicted branches and faulty load instructions.

Each component of the instant reclamation system 102 will now be described by way of example. In some embodiments, the instant reclamation system 102 and/or the out-of-order processor 104 may include more components and/or logical structures than those shown and described herein. Accordingly, the instant reclamation system 102 shown and described is for purposes of illustration and is not intended to restrict to a specific implementation.

As noted above, the instant reclamation system 102 may reside and operate within the out-of-order processor 104. The out-of-order processor 104 may process instructions based on availability of input data used by the instructions rather than by the original program order of the instructions. For example, a program with a set of instructions can dispatch and execute each instruction using an execution unit of the out-of-order processor 104 when necessary inputs for each instruction become available and independent of whether preceding instructions in the program have executed. In this fashion, the out-of-order processor 104 may avoid wasting cycles waiting for inputs for a pending instruction while ignoring subsequent instructions that may have inputs available and may be executed independently from preceding instructions. In one embodiment, the instant reclamation system 102 may be used for handling load faults associated with this out-of-order execution of instructions. As noted above, the instant reclamation system 102 may also be used for handling mis-predicted branch instructions.

As shown in FIG. 1, the instant reclamation system 102 may include a memory ordering buffer 106 (also known as a memory unit). In one embodiment, the memory ordering buffer 106 may be a microarchitecture unit responsible for ordering memory access in the out-of-order processor 104. In one embodiment, the memory ordering buffer 106 may include a load buffer 108. The load buffer 108 may include load instructions 110 after addresses for the load instructions 110 have been resolved and the load instructions 110 have been executed (e.g., using an execution unit of the out-of-order processor 104). Although shown as including the load buffer 108, in some embodiments, the load buffer 108 may be outside the memory ordering buffer 106. The memory ordering buffer 106 may monitor the load buffer 108 for load faults associated with corresponding load instructions $110_1$-$110_N$ (wherein N is greater than or equal to one). In particular, the memory ordering buffer 106 may monitor the load instructions 110 to detect load faults as they occur. For example, the load buffer 108 may be checked periodically (e.g., at a specified interval) to detect load faults. As described in greater detail below, although a load fault may be initially scheduled to be resolved at retirement of the corresponding load instruction 110, the instant reclamation system 102 may resolve the detected load fault prior to retirement of the corresponding load instruction 110 (e.g., prior to forwarding the load instruction 110 to a re-order buffer). A load fault may be any event that causes the associated faulty load instruction 110 to operate on incorrect or out-of-date inputs. For example, these load faults may be caused by one or more of external snoop hits, memory disambiguation mispredictions, memory renaming mismatch, or other similar events that cause changes to instruction inputs.

Figure 2:
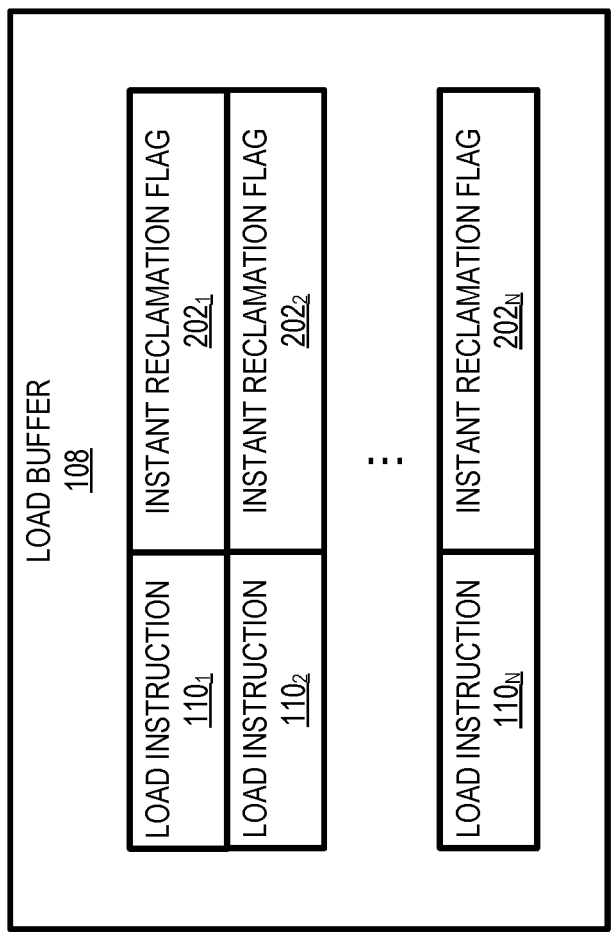
FIG. 2 shows a load buffer according to one example embodiment.

Upon the detection of a load fault, based on monitoring the load buffer 108, the memory ordering buffer 106 may begin or trigger instant reclamation for the associated faulty load instruction 110. In some embodiments, instant reclamation is only available to load instructions 110 authorized/permitted to participate. For example, each load instruction 110 may be associated with a flag or another piece of data that indicates whether the load instruction 110 is permitted to utilize instant reclamation. In one embodiment, each entry in the load buffer 108 may include a flag indicating whether the corresponding load instruction 110 associated with the entry is permitted to utilize instant reclamation to resolve load faults. FIG. 2 shows the load buffer 108 according to one example embodiment. As shown, each load instruction $110_1$-$110_N$, may be associated with a corresponding instant reclamation flag $202_1$-$202_N$. As described above, the instant reclamation flag 202 may be toggled to indicate whether instant reclamation is available for the corresponding load instruction 110.

In one embodiment, this permission to perform instant reclamation may be based on the proximity of the load instruction 110 to a preceding branch instruction (also referred to as a jump instruction). For example, if a load instruction 110 is more than a predefined distance from a preceding branch instruction, then instant reclamation is not available for resolving a load fault of the faulty load instruction 110. Instead, the detected load fault of the faulty load instruction 110 must be resolved at retirement of the faulty load instruction 110. As described below, the address of faulty load instructions 110 used for re-fetching and re-execution is generated based on an address associated with a preceding branch instruction and a set of address bits from the original faulty load instruction 110. In one embodiment, when the distant between the faulty load instruction 110 and a preceding branch instruction is greater than the resolution of the set of address bits of the faulty load instruction 110, instant reclamation is not permitted for the faulty load instruction 110.

In one embodiment, when instant reclamation is available for a faulty load instruction 110, the memory ordering buffer 106 may begin instant reclamation by transmitting an early load fault indication 112 to a reservation station 114. The early load fault indication 112 may correspond to the faulty load instruction 110 and may indicate to the reservation station 114, that a load fault was detected for the indicated faulty load instruction 110. The reservation station 114 may be a buffer that holds instructions that have not yet executed and dispatches these instructions to units based on availability of inputs. For example, the reservation station 114 may hold a faulty load instruction 110 until inputs for the load instruction 110 are available. In some embodiments, the reservation station 114 may be referred to as an out-of-order unit and may be either an integer reservation station or a floating-point reservation station.

In some embodiments, the early load fault indication 112 may be simultaneously transmitted to other components or logical units of the instant reclamation system 102 in addition to the reservation station 114. For example, the early load fault indication 112 may also be sent to the branch information table (BIT) multiplexer 116 and/or the front-end unit 118. In one embodiment, the early load fault indication 112 may be used to prepare the BIT multiplexer 116 and/or the front-end unit 118 to handle information associated with a faulty load instruction 110 instead of information associated with a mis-predicted branch instruction.

In some embodiments, the early load fault indication 112 may include or may be transmitted to the reservation station 114 along with various pieces of load information 120 associated with the faulty load instruction 110. For example, the load information 120 may include a load buffer identifier associated with the faulty load instruction 110. The load buffer identifier may uniquely identify the faulty load instruction 110 in the load buffer 108. As will be described below, the load information 120 may be used by the reservation station 114 to generate an early instant reclamation request 122 (e.g., an early MOClear).

In some embodiments, the memory ordering buffer 106 may additionally transmit a set of address bits 124 of the faulty load instruction 110 to a combination unit 126. As will be described in greater detail below, the combination unit 126 may combine the set of address bits 124 with address bits of a branch address associated with a preceding branch instruction (e.g., a branch instruction that precedes the faulty load instruction 110 in program order) to identify the faulty load instruction 110 to be re-fetched and executed. In some embodiments, the branch address associated with the preceding branch instruction may correspond to (1) the address of the preceding branch instruction in memory or (2) the address of the location where the preceding branch instruction jumps or branches to in memory (i.e., a target address). In some embodiments, the set of address bits 124 correspond to the lower ten bits of an instruction pointer of the faulty load instruction 110. However, in other embodiments, the set of address bits 124 may correspond to any part of an address of the faulty load instruction 110.

In one embodiment, the reservation station 114 stores instant reclamation information within a load information table 130 that is used to generate the early instant reclamation request 122 and/or determine a load BIT identifier 128 associated with the faulty load instruction 110. This instant reclamation information may be accessed from the load information table 130 using the load information 120 from the memory ordering buffer 106. In one embodiment, the load information table 130 is an array that is the same size as the load buffer 108. For example, FIG. 3 shows a load information table 130 according to one example embodiment. As shown in FIG. 3, each load instruction $110_1$-$110_N$ represented in the load buffer 108 has a corresponding entry $302_1$-$302_N$ in the load information table 130. In one embodiment, the load information table 130 may include one or more of a BIT identifier 304, a reorder buffer identifier 306, a store buffer identifier 308, and a load buffer identifier 310.

Although described as the load information table 130 being located in the reservation station 114, in other embodiments the load information table 130 may be located in other components within the instant reclamation system 102. For example, FIG. 4 shows the load information table 130 included in the memory ordering buffer 106 according to one example embodiment. In this embodiment, the load information 120 used to generate the early instant reclamation request 122 and/or to determine a load BIT identifier 128 associated with the faulty load instruction 110 may include one or more of a BIT identifier (BIT ID) 304, a reorder buffer identifier (ROB ID) 306, a store buffer identifier (SB ID) 308, and a load buffer identifier (LB ID) 310.

As noted above, the reservation station 114 generates an early instant reclamation request 122. In one embodiment, the early instant reclamation request 122 is transmitted to a jump execution unit 132 (also known as a branch unit) and may include a reorder buffer identifier 306, a store buffer identifier 308, and a load buffer identifier 310. In some embodiments, the early instant reclamation request 122 may only be sent to the jump execution unit 132 when the jump execution unit 132 is not already handling a branch instruction. If the jump execution unit 132 is presently handling a branch instruction, transmission of the early instant reclamation request 122 may be deferred to a cycle in which the jump execution unit 132 is no longer handling a branch instruction or the load fault associated with the faulty load instruction 110 may be resolved at retirement of the faulty load instruction 110. In this fashion, priority in the instant reclamation system 102 is given to branch instructions.

As noted above, the instant reclamation information within the load information table 130 may be used for determining a load BIT identifier 128 associated with the faulty load instruction 110. The load BIT identifier 128 may be transmitted to (1) the jump execution unit 132 for analysis and (2) the BIT multiplexer 116. The jump execution unit 132 may transmit a load clear 150 (e.g., a MOClear) when the jump execution unit 132 is handling a faulty load instruction 110 or a branch clear 152 (e.g., a JEClear) when the jump execution unit 132 is handling a mis-predicted branch instruction. In one embodiment, the jump execution unit 132 compares the age of the faulty load instruction 110 identified by the load BIT identifier 128 and/or the early instant reclamation request 122 with ages of other instructions currently being handled by the jump execution unit 132. For example, the jump execution unit 132 may determine whether any mis-predicted branch instructions are being handled by the out-of-order processor 104 that are older than the faulty load instruction 110 (e.g., the mis-predicted load instruction being handled occurs earlier in program order than the faulty load instruction 110). Since the instruction pipeline will be cleared for all instructions that are after (in program order) a mis-predicted branch instruction, re-fetching will not commence from the faulty load instruction 110, but instead will commence from the mis-predicted branch instruction. Thus, a load clear 152 for the faulty load instruction 110 will be ignored by the out-of-order processor 104 when the faulty load instruction 110 is younger than a mis-predicted branch instruction.

As noted above, the BIT multiplexer 116 may receive the load BIT identifier 128 from the reservation station 114. In some embodiments, the reservation station 114 may alternatively transmit a branch BIT identifier 140 to the BIT multiplexer 116. The branch BIT identifier 140 may correspond to a mis-predicted branch instruction. In response to the early load fault indication 112, the BIT multiplexer 116 may transmit the load BIT identifier 128 to the front-end unit 118 as the BIT identifier 142. Otherwise, the branch BIT identifier 140 is transmitted to the front-end unit 118 as the BIT identifier 142 for handling of the mis-predicted branch instruction. As noted above, preference is given to processing mis-predicted branch instructions such that load faults either defer to mis-predicted branches or are resolved at retirement of a corresponding faulty load instruction 110.

The BIT identifier 142 transmitted from the BIT multiplexer 116 may be received by a BIT 144 of the front-end unit 118. The BIT 144 may include mappings of BIT identifiers to branch addresses. The branch address 146 returned when the BIT identifier 142 is the load BIT identifier 128, may be associated with the branch instruction preceding the faulty load instruction 110 in program order. In some embodiments, the branch address 146 associated with the preceding branch instruction may correspond to (1) the address of the preceding branch instruction in memory or (2) the address of the location where the preceding branch instruction jumps or branches to in memory (i.e., a target address). As noted above, this branch address 146 associated with the preceding branch instruction will be used for identifying the address of the faulty load instruction 110. The output of the BIT 144 is transmitted to both the front-end multiplexer 138 and the combination unit 126.

As noted above, the combination unit 126 receives a set of address bits 124 of the faulty load instruction 110. For example, the set of address bits 124 may be the lower ten bits of an instruction pointer of the faulty load instruction 110. The combination unit 126 may combine the branch address 146 from the BIT 144 with the set of address bits 124 from the memory ordering buffer 106 to generate the reconstructed load address 148 of the faulty load instruction 110. In one example, the upper bits of the branch address 146 may be combined with the set of address bits 124, which are the lower bits of the instruction pointer of the faulty load instruction 110, to generate the reconstructed load address 148 of the faulty load instruction 110. For example, bits [47:10] of the branch address 146 may represent the upper bits of the reconstructed load address 148 of the faulty load instruction 110 while the set of address bits 124 (e.g., bits [9:0] of the instruction pointer of the faulty load instruction 110) may represent the lower bits of the reconstructed load address 148 of the faulty load instruction 110. Although described herein as the set of address bits 124 being only a partial address (e.g., the bits [47:10] of the load address), in some embodiments the set of address bits 124 may be the entire load address.

When the jump execution unit 132 is operating on a faulty load instruction 110, the jump execution unit 132 may output the load clear 150 to the front-end multiplexer 138. The load clear 150 may cause the front-end multiplexer 138 to output the reconstructed load address 148 at operation such that re-fetching of instructions may commence from the reconstructed load address 148. In other embodiments, when the jump execution unit 132 is operating on a mis-predicted branch instruction, the jump execution unit 132 may output the branch clear 152 to the front-end multiplexer 138. The branch clear 152 may cause the front-end multiplexer 138 to output the branch address 146.

As noted above, the jump execution unit 132 may determine whether any mis-predicted branch instructions are being handled that are older than the faulty load instruction 110 (e.g., the mis-predicted load instruction being handled occurs earlier in program order than the faulty load instruction 110). Since the instruction pipeline will be cleared for all instructions that are after (in program order) a mis-predicted branch instruction, re-fetching will not commence from the faulty load instruction 110, but instead will commence from the mis-predicted branch instruction. Thus, a load clear 152 for the faulty load instruction 110 will be ignored by the out-of-order processor 104 when younger than a mis-predicted branch instruction. In the case of a mis-predicted branch instruction, fetching of instructions may be performed from (1) the address of the preceding branch instruction in memory or (2) the address of the location where the preceding branch instruction jumps or branches to in memory (i.e., a target address).

Figure 5A:
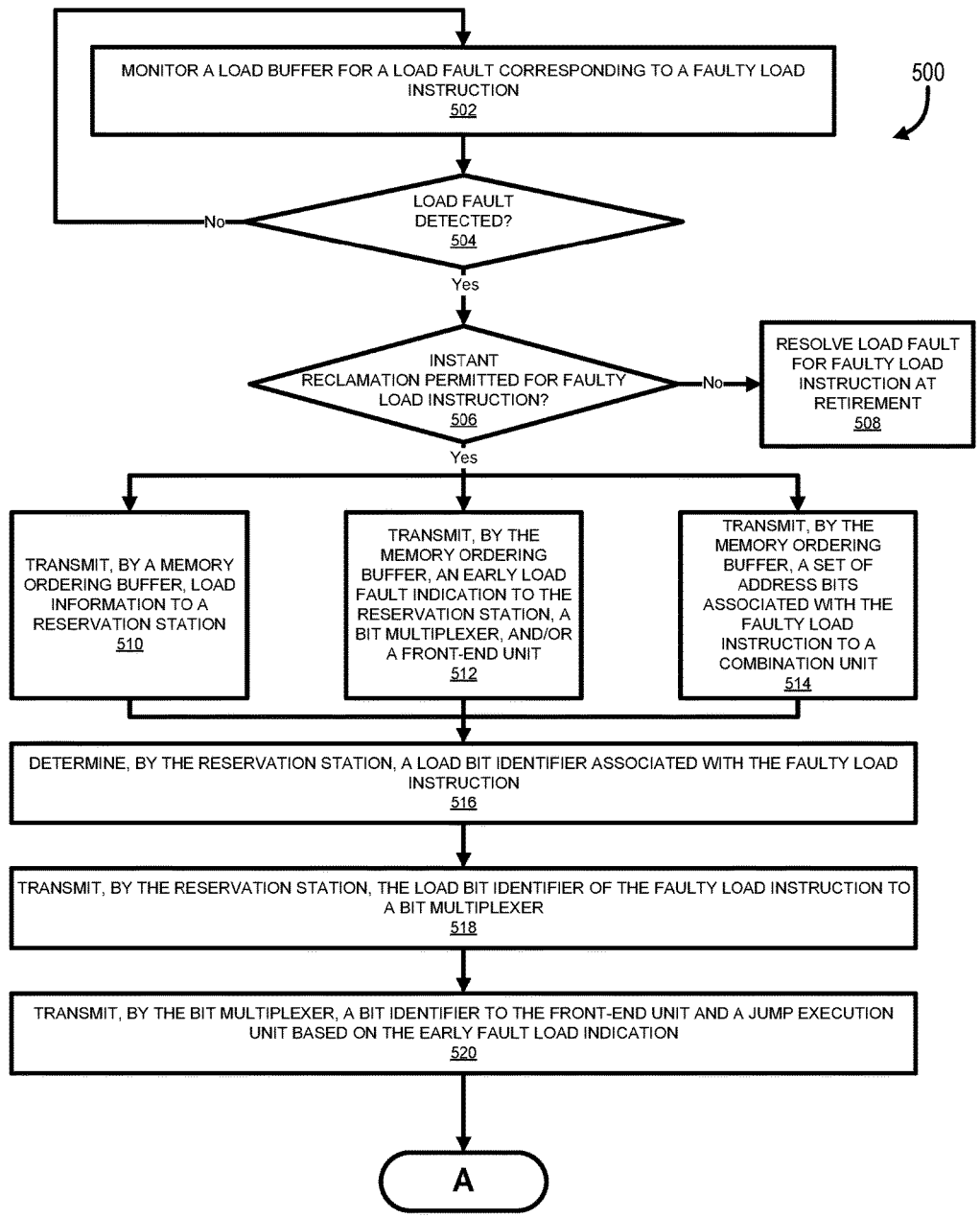
FIG. 5A shows a first part of a method for resolving a load fault of a faulty load instruction according to one example embodiment.
Figure 5B:
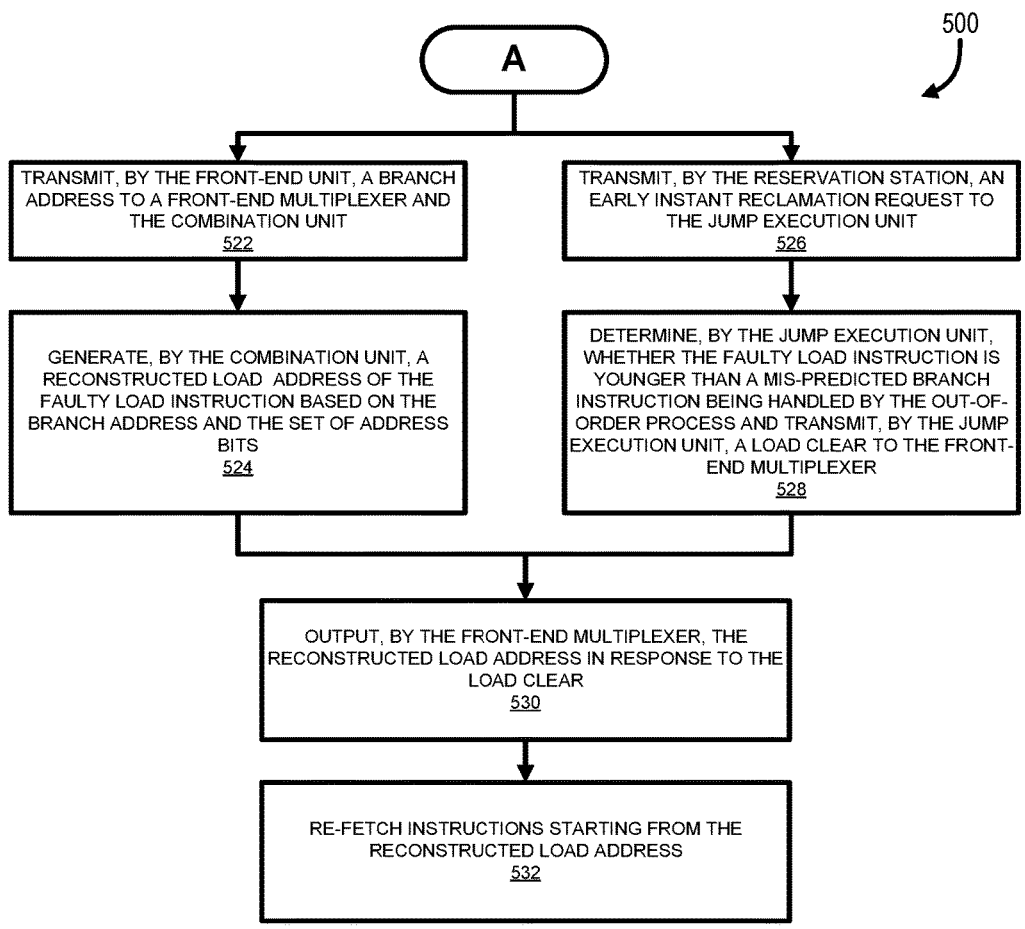
FIG. 5B shows a second part of the method for resolving the load fault of the faulty load instruction according to one example embodiment.

Turning now to FIGS. 5A and 5B, a method 500 will be described according to one example embodiment for resolving a load fault of a faulty load instruction 110. As described herein, resolving the load fault may be performed using instant reclamation such that the load fault may be resolved upon detection instead of at retirement of the faulty load instruction 110.

In one embodiment, the method 500 may be performed by one or more components of the instant reclamation system 102. For example, the method 500 may be performed by one or more of the memory ordering buffer 106, the reservation station 114, the jump execution unit 132, and/or the front-end unit 118 working in conjunction to perform one or more of the operations of the method 500.

Although shown in a particular order, the operations of the method 500 may be performed in a different order. For example, two or more operations of the method 500 may be performed in partially or in entirely overlapping time periods. Further, in some embodiments, the method 500 may include additional operations not shown or described herein. Accordingly, the method 500 is intended to be illustrative rather than restrictive to a particular implementation.

The method 500 may commence at operation 502 with monitoring the load buffer 108 by a memory ordering buffer 106 to potentially detect a load fault with a corresponding faulty load instruction 110. At operation 504, the method 500 may determine whether a load fault was detected. As noted above, these load faults may be caused by external snoop hits, memory disambiguation misprediction, memory renaming mismatch, or other similar events. When a load fault is not detected at operation 504, the method 500 may return to operation 502 to continue monitoring the load buffer 108.

Conversely, upon detecting a load fault at operation 504, the method 500 may move to operation 506 to determine whether instant reclamation is permitted for resolving the load fault of the faulty load instruction 110. In one embodiment, operation 506 may determine whether instant reclamation is permitted for resolving the load fault of the faulty load instruction 110 by examining an instant reclamation flag 202 associated with the faulty load instruction 110.

Upon determining that instant reclamation is not permitted for resolving the load fault of the faulty load instruction 110, the method 500 may move to operation 508. At operation 508 the load fault may be resolved at retirement of the faulty load instruction 110. However, when instant reclamation is permitted for resolving the load fault of the faulty load instruction 110, the method 500 may move to operations 510, 512, and/or 514. Although shown as being performed in overlapping time periods, in other embodiments, two or more of the operations 510, 512, and 514 may be performed sequentially.

At operation 510, the memory ordering buffer 106 may transmit the load information 120 to the reservation station 114. The load information 120 may be used by the reservation station 114 to generate an early instant reclamation request 122 as will be described below. In one embodiment, the load information 120 may include a load buffer identifier associated with the faulty load instruction 110.

At operation 512, the memory ordering buffer 106 may transmit the early load fault indication 112 to one or more of the reservation station 114, the BIT multiplexer 116, and the front-end unit 118. In one embodiment, the early load fault indication 112 may be used by the reservation station 114, the BIT multiplexer 116, and/or the front-end unit 118 to indicate that a load fault was detected for the faulty load instruction 110 and/or to prepare these components of the instant reclamation system 102 to handle a faulty load instruction 110 instead of a mis-predicted branch instruction.

At operation 514, the memory ordering buffer 106 may transmit a set of address bits 124 of the faulty load instruction 110 to a combination unit 126. In some embodiments, the set of address bits 124 correspond to the lower ten bits of an instruction pointer of the faulty load instruction 110. However, in other embodiments, the set of address bits 124 may correspond to any part of an address of the faulty load instruction 110. For example, the set of address bits 124 may be all the address bits of the load address.

Following at least operation 510, the method 500 may move to operation 516. At operation 516, the reservation station 114 may determine a load BIT identifier 128 associated with the faulty load instruction 110. In one embodiment, this load BIT identifier 128 may be identified using a load information table 130 based on the load information 120 received from the memory ordering buffer 106. In one embodiment, the load BIT identifier 128 may correspond to a branch instruction that precedes the faulty load instruction 110 in program order. As described herein, the preceding branch instruction will be used to for constructing the address the faulty load instruction 110 for re-fetching and re-execution. At operation 518, the load BIT identifier may be transmitted to the BIT multiplexer 116.

At operation 520, the BIT multiplexer 116 may transmit a BIT identifier 142 to the front-end unit 118 and the jump execution unit 132. In one embodiment, the BIT multiplexer 116 may alternatively receive a branch BIT identifier 140 corresponding to a mis-predicted branch instruction. The BIT multiplexer 116 may transmit either the branch BIT identifier 140 or the load BIT identifier 128 (in response to the early load fault indication 112) to the front-end unit 118.

At operation 522, the front-end unit 118 may transmit a branch address 146 to the front-end multiplexer 138 and the combination unit 126. In one embodiment, the branch address 146 may be determined based on the BIT 144. In this embodiment, the BIT 144 stores mappings of BIT identifiers to branch addresses and the branch address 146 transmitted to the front-end multiplexer 138 and the combination unit 126 is mapped to the BIT identifier 142 received from the BIT multiplexer 116. In some embodiments, the branch address 146 is associated with the preceding branch instruction and may correspond to (1) the address of the preceding branch instruction in memory or (2) the address of the location where the preceding branch instruction jumps or branches to in memory (i.e., a target address).

At operation 524, the combination unit 126 may generate the reconstructed load address 148 of the faulty load instruction 110. In one embodiment, the reconstructed load address 148 of the faulty load instruction 110 may be generated as a combination of the branch address 146 received from the front-end unit 118 and the set of address bits 124 received from the memory ordering buffer 106. For example, bits [47:10] of the branch address 146 may represent the upper bits of the reconstructed load address 148 of the faulty load instruction 110 while the set of address bits 124 (e.g., bits [9:0] of the instruction pointer of the faulty load instruction 110) may represent the lower bits of the reconstructed load address 148 of the faulty load instruction 110. In some embodiments, the branch address 146 associated with the preceding branch instruction may correspond to (1) the address of the preceding branch instruction in memory or (2) the address of the location where the preceding branch instruction jumps or branches to in memory (i.e., a target address).

The front-end multiplexer 138 may selectively output one of the branch address 146 and the reconstructed load address 148 of the faulty load instruction 110. In one embodiment, the determination of which of the branch address 146 and the reconstructed load address 148 to output may be determined by the front-end multiplexer 138 based on an input from the jump execution unit 132.

In one embodiment, the reservation station 114 may transmit an early instant reclamation request 122 to the jump execution unit 132 at operation 526. In one embodiment, the early instant reclamation request 122 may include a reorder buffer identifier 306, a store buffer identifier 308, and a load buffer identifier 310 associated with the faulty load instruction 110. In some embodiments, the early instant reclamation request 122 may only be sent to the jump execution unit 132 when the jump execution unit 132 is not already handling a branch instruction. If the jump execution unit 132 is presently handling a branch instruction, transmission of the early instant reclamation request 122 may be deferred to a cycle in which the jump execution unit 132 is no longer handling a branch instruction or the load fault associated with the faulty load instruction 110 may be resolved at retirement of the faulty load instruction 110 (e.g., operation 508). In this fashion, priority in the instant reclamation system 102 is given to branch instructions.

At operation 528, the jump execution unit 132 may determine whether the faulty load instruction 110 is younger than a mis-predicted branch instruction being handled by the out-of-order processor 104 and may transmit a load clear 105 to the front-end multiplexer 138. As noted above, the front-end multiplexer 138 may selectively output one of the branch address 146 and the reconstructed load address 148 of the faulty load instruction 110 based on an input from the jump execution unit 132. When the jump execution unit 132 is operating on a faulty load instruction 110, the jump execution unit 132 may output the load clear 150 to the front-end multiplexer 138. The load clear 150 may cause the front-end multiplexer 138 to output the reconstructed load address 148 at operation 530 such that instructions may be re-fetched at operation 532 starting from the reconstructed load address 148. Alternatively, when the jump execution unit 132 is operating on a mis-predicted branch instruction, the jump execution unit 132 may output the branch clear 152 to the front-end multiplexer 138. The branch clear 152 may cause the front-end multiplexer 138 to output the branch address 146.

As noted above, the jump execution unit 132 may determine whether any mis-predicted branch instructions are being handled by the out-of-order processor 104 that are older than the faulty load instruction 110 (e.g., the mis-predicted load instruction being handled occurs earlier in program order than the faulty load instruction 110). Since the instruction pipeline will be cleared for all instructions that are after (in program order) a mis-predicted branch instruction, re-fetching will not commence from the faulty load instruction 110, but instead will commence from the mis-predicted branch instruction. Thus, a load clear 152 for the faulty load instruction 110 will be ignored by the out-of-order processor 104 when younger than a mis-predicted branch instruction.

As described above, the method 500, which may be performed using the instant reclamation system 102, provides an efficient technique to handle load faults for faulty load instructions 110. In particular, by using instant reclamation to resolve a load fault, the method 500 and the instant reclamation system 102 may clear instructions after the faulty load instruction 110 and re-fetch instructions starting from the faulty load instruction 110 without waiting for the faulty load instruction to retire. Thus, the load fault is resolved faster allowing an increase in instructions executed per cycle of the out-of-order processor 104. This may ultimately result in power-savings for the out-of-order processor 104 as instructions following the faulty load instructions 110 are not performed until the faulty load instruction is re-executed to correct the load fault. Further, the instant reclamation system 102 may also support mis-predicted branches to either fetch instructions after the mis-predicted branch instruction or from the target address of the mis-predicted branch instruction.

FIG. 6A is a block diagram illustrating both an exemplary in-order pipeline and an exemplary register renaming, out-of-order issue/execution pipeline according to embodiments of the invention. FIG. 6B is a block diagram illustrating both an exemplary embodiment of an in-order architecture core and an exemplary register renaming, out-of-order issue/execution architecture core to be included in a processor according to embodiments of the invention. The solid lined boxes in FIGS. 6A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 6A, a processor pipeline 600 includes a fetch stage 602, a length decode stage 604, a decode stage 606, an allocation stage 608, a renaming stage 610, a scheduling (also known as a dispatch or issue) stage 612, a register read/memory read stage 614, an execute stage 616, a write back/memory write stage 618, an exception handling stage 622, and a commit stage 624.

FIG. 6B shows processor core 690 including a front-end unit 630 coupled to an execution engine unit 650, and both are coupled to a memory unit 670. The core 690 may be a reduced instruction set computing (RISC) core, a complex instruction set computing (CISC) core, a very long instruction word (VLIW) core, or a hybrid or alternative core type. As yet another option, the core 690 may be a special-purpose core, such as, for example, a network or communication core, compression engine, coprocessor core, general purpose computing graphics processing unit (GPGPU) core, graphics core, or the like.

The front-end unit 630 includes a branch prediction unit 632 coupled to an instruction cache unit 634, which is coupled to an instruction translation lookaside buffer (TLB) 636, which is coupled to an instruction fetch unit 638, which is coupled to a decode unit 640. The decode unit 640 (or decoder) may decode instructions, and generate as an output one or more micro-operations, micro-code entry points, microinstructions, other instructions, or other control signals, which are decoded from, or which otherwise reflect, or are derived from, the original instructions. The decode unit 640 may be implemented using various different mechanisms. Examples of suitable mechanisms include, but are not limited to, look-up tables, hardware implementations, programmable logic arrays (PLAs), microcode read only memories (ROMs), etc. In one embodiment, the core 690 includes a microcode ROM or other medium that stores microcode for certain macroinstructions (e.g., in decode unit 640 or otherwise within the front-end unit 630). The decode unit 640 is coupled to a rename/allocator unit 652 in the execution engine unit 650.

The execution engine unit 650 includes the rename/allocator unit 652 coupled to a retirement unit 654 and a set of one or more scheduler unit(s) 656. The scheduler unit(s) 656 represents any number of different schedulers, including reservations stations, central instruction window, etc. The scheduler unit(s) 656 is coupled to the physical register file(s) unit(s) 658. Each of the physical register file(s) units 658 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 658 comprises a vector registers unit, a write mask registers unit, and a scalar registers unit. These register units may provide architectural vector registers, vector mask registers, and general-purpose registers. The physical register file(s) unit(s) 658 is overlapped by the retirement unit 654 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 654 and the physical register file(s) unit(s) 658 are coupled to the execution cluster(s) 660. The execution cluster(s) 660 includes a set of one or more execution units 662 and a set of one or more memory access units 664. The execution units 662 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 656, physical register file(s) unit(s) 658, and execution cluster(s) 660 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 664). It should also be understood that where separate pipelines are used, one or more of these pipelines may be out-of-order issue/execution and the rest in-order.

The set of memory access units 664 is coupled to the memory unit 670, which includes a data TLB unit 672 coupled to a data cache unit 674 coupled to a level 2 (L2) cache unit 676. In one exemplary embodiment, the memory access units 664 may include a load unit, a store address unit, and a store data unit, each of which is coupled to the data TLB unit 672 in the memory unit 670. The instruction cache unit 634 is further coupled to a level 2 (L2) cache unit 676 in the memory unit 670. The L2 cache unit 676 is coupled to one or more other levels of cache and eventually to a main memory.

By way of example, the exemplary register renaming, out-of-order issue/execution core architecture may implement the pipeline 600 as follows: 1) the instruction fetch 638 performs the fetch and length decoding stages 602 and 604; 2) the decode unit 640 performs the decode stage 606; 3) the rename/allocator unit 652 performs the allocation stage 608 and renaming stage 610; 4) the scheduler unit(s) 656 performs the schedule stage 612; 5) the physical register file(s) unit(s) 658 and the memory unit 670 perform the register read/memory read stage 614; the execution cluster 660 perform the execute stage 616; 6) the memory unit 670 and the physical register file(s) unit(s) 658 perform the write back/memory write stage 618; 7) various units may be involved in the exception handling stage 622; and 8) the retirement unit 654 and the physical register file(s) unit(s) 658 perform the commit stage 624.

The core 690 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 690 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 634/674 and a shared L2 cache unit 676, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 7A:
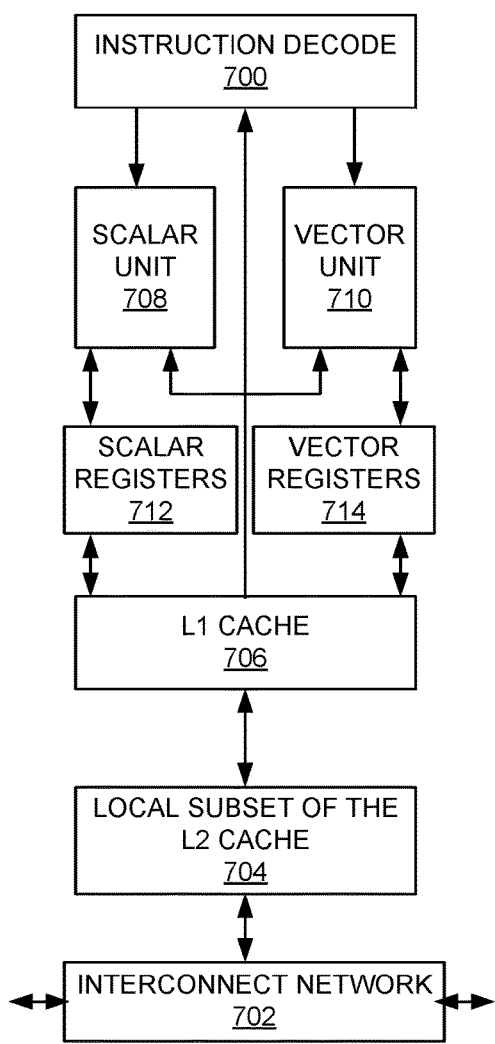
FIGS. 7A-B illustrate a block diagram of a more specific exemplary in-order core architecture, which core would be one of several logic blocks (including other cores of the same type and/or different types) in a chip.
Figure 7B:
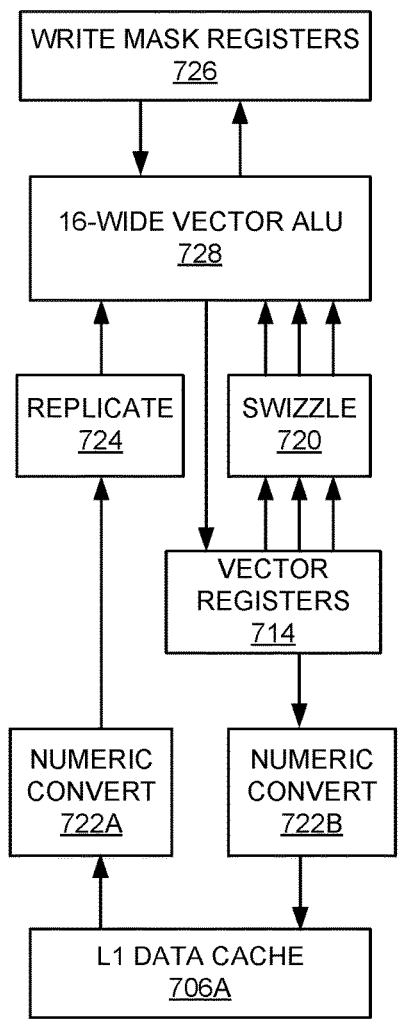

FIGS. 7A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 7A is a block diagram of a single processor core, along with its connection to the on-die interconnect network 702 and with its local subset of the Level 2 (L2) cache 704, according to embodiments of the invention. In one embodiment, an instruction decoder 700 supports the x86 instruction set with a packed data instruction set extension. An L1 cache 706 allows low-latency accesses to cache memory into the scalar and vector units. While in one embodiment (to simplify the design), a scalar unit 708 and a vector unit 710 use separate register sets (respectively, scalar registers 712 and vector registers 714) and data transferred between them is written to memory and then read back in from a level 1 (L1) cache 706, alternative embodiments of the invention may use a different approach (e.g., use a single register set or include a communication path that allow data to be transferred between the two register files without being written and read back).

The local subset of the L2 cache 704 is part of a global L2 cache that is divided into separate local subsets, one per processor core. Each processor core has a direct access path to its own local subset of the L2 cache 704. Data read by a processor core is stored in its L2 cache subset 704 and can be accessed quickly, in parallel with other processor cores accessing their own local L2 cache subsets. Data written by a processor core is stored in its own L2 cache subset 704 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 7B is an expanded view of part of the processor core in FIG. 7A according to embodiments of the invention. FIG. 7B includes an L1 data cache 706A part of the L1 cache 704, as well as more detail regarding the vector unit 710 and the vector registers 714. Specifically, the vector unit 710 is a 16-wide vector processing unit (VPU) (see the 16-wide ALU 728), which executes one or more of integer, single-precision float, and double-precision float instructions. The VPU supports swizzling the register inputs with swizzle unit 720, numeric conversion with numeric convert units 722A-B, and replication with replication unit 724 on the memory input. Write mask registers 726 allow predicating resulting vector writes.

Figure 8:
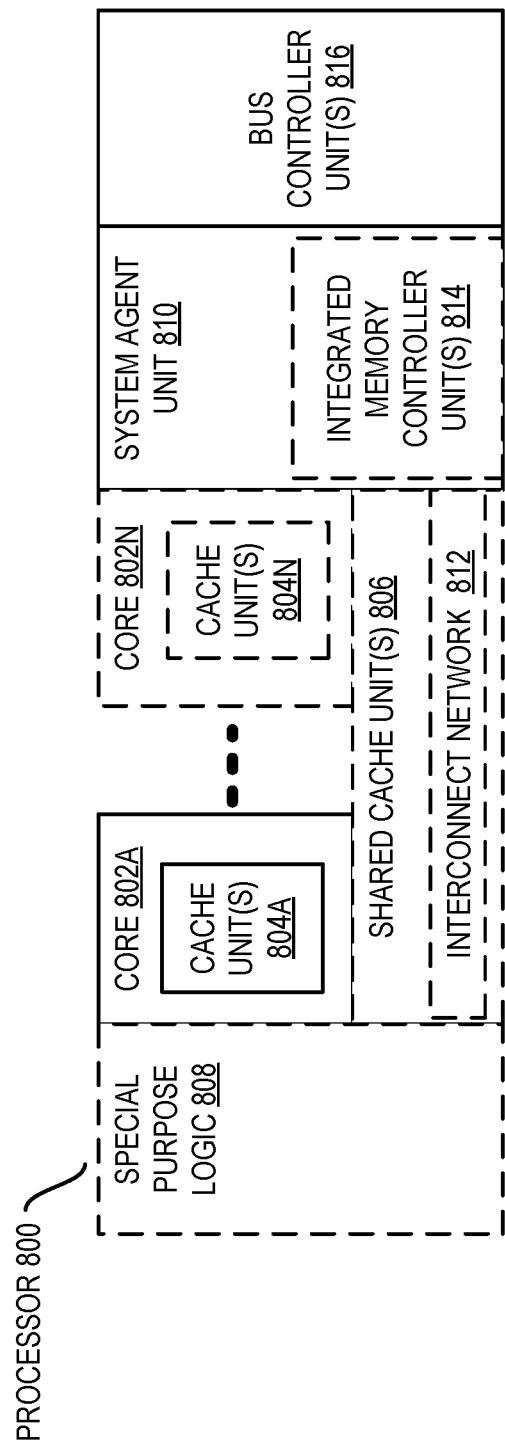
FIG. 8 is a block diagram of a processor that may have more than one core, may have an integrated memory controller, and may have integrated graphics according to embodiments of the invention.

FIG. 8 is a block diagram of a processor 800 that may have more than one core, may have an integrated memory controller, and may have integrated graphics according to embodiments of the invention. The solid lined boxes in FIG. 8 illustrate a processor 800 with a single core 802A, a system agent 810, a set of one or more bus controller units 816, while the optional addition of the dashed lined boxes illustrates an alternative processor 800 with multiple cores 802A-N, a set of one or more integrated memory controller unit(s) 814 in the system agent unit 810, and special purpose logic 808.

Thus, different implementations of the processor 800 may include: 1) a CPU with the special purpose logic 808 being integrated graphics and/or scientific (throughput) logic (which may include one or more cores), and the cores 802A-N being one or more general purpose cores (e.g., general purpose in-order cores, general purpose out-of-order cores, a combination of the two); 2) a coprocessor with the cores 802A-N being a large number of special purpose cores intended primarily for graphics and/or scientific (throughput); and 3) a coprocessor with the cores 802A-N being a large number of general purpose in-order cores. Thus, the processor 800 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 800 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 806, and external memory (not shown) coupled to the set of integrated memory controller units 814. The set of shared cache units 806 may include one or more mid-level caches, such as level 2 (L2), level 3 (L3), level 4 (L4), or other levels of cache, a last level cache (LLC), and/or combinations thereof. While in one embodiment a ring based interconnect unit 812 interconnects the integrated graphics logic 808 (integrated graphics logic 808 is an example of and is also referred to herein as special purpose logic), the set of shared cache units 806, and the system agent unit 810/integrated memory controller unit(s) 814, alternative embodiments may use any number of well-known techniques for interconnecting such units. In one embodiment, coherency is maintained between one or more cache units 806 and cores 802-A-N.

In some embodiments, one or more of the cores 802A-N are capable of multithreading. The system agent 810 includes those components coordinating and operating cores 802A-N. The system agent unit 810 may include for example a power control unit (PCU) and a display unit. The PCU may be or include logic and components needed for regulating the power state of the cores 802A-N and the integrated graphics logic 808. The display unit is for driving one or more externally connected displays.

The cores 802A-N may be homogenous or heterogeneous in terms of architecture instruction set; that is, two or more of the cores 802A-N may be capable of execution the same instruction set, while others may be capable of executing only a subset of that instruction set or a different instruction set.

FIGS. 9-12 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 9:
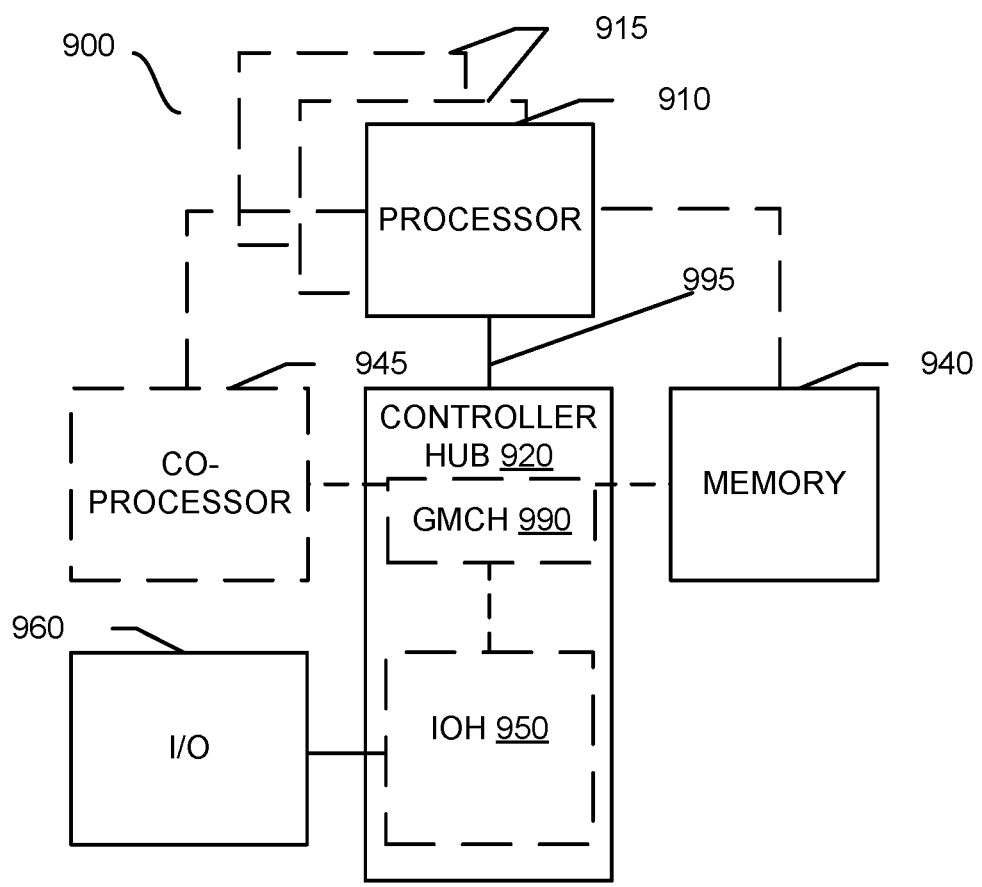
FIGS. 9-12 are block diagrams of exemplary computer architectures.

Referring now to FIG. 9, shown is a block diagram of a system 900 in accordance with one embodiment of the present invention. The system 900 may include one or more processors 910, 915, which are coupled to a controller hub 920. In one embodiment, the controller hub 920 includes a graphics memory controller hub (GMCH) 990 and an Input/Output Hub (IOH) 950 (which may be on separate chips); the GMCH 990 includes memory and graphics controllers to which are coupled memory 940 and a coprocessor 945; the IOH 950 couples input/output (I/O) devices 960 to the GMCH 990. Alternatively, one or both of the memory and graphics controllers are integrated within the processor (as described herein), the memory 940 and the coprocessor 945 are coupled directly to the processor 910, and the controller hub 920 in a single chip with the IOH 950.

The optional nature of additional processors 915 is denoted in FIG. 9 with broken lines. Each processor 910, 915 may include one or more of the processing cores described herein and may be some version of the processor 800.

The memory 940 may be, for example, dynamic random-access memory (DRAM), phase change memory (PCM), or a combination of the two. For at least one embodiment, the controller hub 920 communicates with the processor(s) 910, 915 via a multi-drop bus, such as a frontside bus (FSB), point-to-point interface such as QuickPath Interconnect (QPI), or similar connection 995.

In one embodiment, the coprocessor 945 is a special-purpose processor, such as, for example, a high-throughput MIC processor, a network or communication processor, compression engine, graphics processor, GPGPU, embedded processor, or the like. In one embodiment, controller hub 920 may include an integrated graphics accelerator.

There can be a variety of differences between the physical resources 910, 915 in terms of a spectrum of metrics of merit including architectural, microarchitectural, thermal, power consumption characteristics, and the like.

In one embodiment, the processor 910 executes instructions that control data processing operations of a general type. Embedded within the instructions may be coprocessor instructions. The processor 910 recognizes these coprocessor instructions as being of a type that should be executed by the attached coprocessor 945. Accordingly, the processor 910 issues these coprocessor instructions (or control signals representing coprocessor instructions) on a coprocessor bus or other interconnect, to coprocessor 945. Coprocessor(s) 945 accept and execute the received coprocessor instructions.

Figure 10:
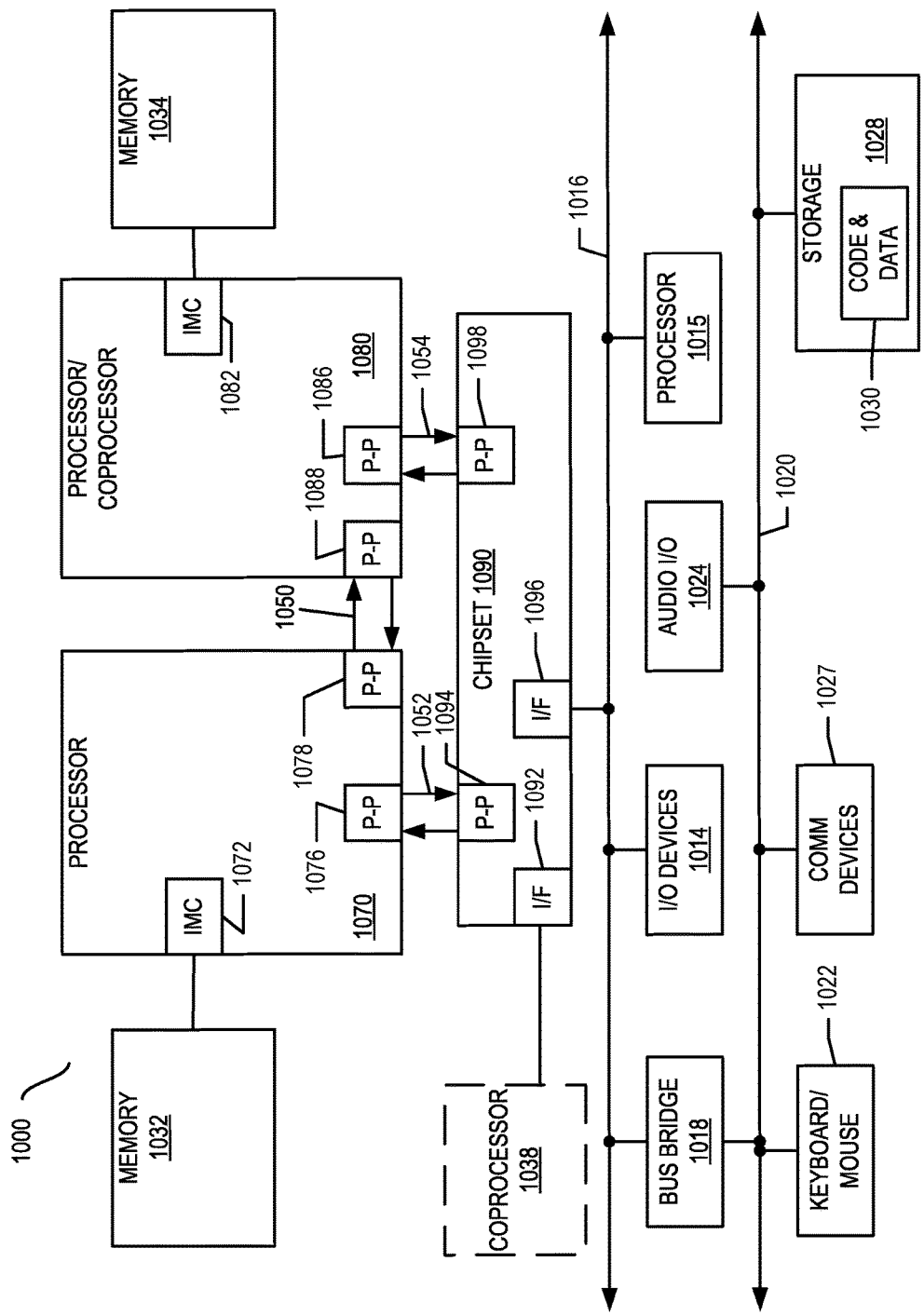

Referring now to FIG. 10, shown is a block diagram of a first more specific exemplary system 1000 in accordance with an embodiment of the present invention. As shown in FIG. 10, multiprocessor system 1000 is a point-to-point interconnect system, and includes a first processor 1070 and a second processor 1080 coupled via a point-to-point interconnect 1050. Each of processors 1070 and 1080 may be some version of the processor 800. In one embodiment of the invention, processors 1070 and 1080 are respectively processors 910 and 915, while coprocessor 1038 is coprocessor 945. In another embodiment, processors 1070 and 1080 are respectively processor 910 coprocessor 945.

Processors 1070 and 1080 are shown including integrated memory controller (IMC) units 1072 and 1082, respectively. Processor 1070 also includes as part of its bus controller units point-to-point (P-P) interfaces 1076 and 1078; similarly, second processor 1080 includes P-P interfaces 1086 and 1088. Processors 1070, 1080 may exchange information via a point-to-point (P-P) interface 1050 using P-P interface circuits 1078, 1088. As shown in FIG. 10, IMCs 1072 and 1082 couple the processors to respective memories, namely a memory 1032 and a memory 1034, which may be portions of main memory locally attached to the respective processors.

Processors 1070, 1080 may each exchange information with a chipset 1090 via individual P-P interfaces 1052, 1054 using point to point interface circuits 1076, 1094, 1086, 1098. Chipset 1090 may optionally exchange information with the coprocessor 1038 via a high-performance interface 1092. In one embodiment, the coprocessor 1038 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1090 may be coupled to a first bus 1016 via an interface 1096. In one embodiment, first bus 1016 may be a Peripheral Component Interconnect (PCI) bus, or a bus such as a PCI Express bus or another third generation I/O interconnect bus, although the scope of the present invention is not so limited.

As shown in FIG. 10, various I/O devices 1014 may be coupled to first bus 1016, along with a bus bridge 1018 which couples first bus 1016 to a second bus 1020. In one embodiment, one or more additional processor(s) 1015, such as coprocessors, high-throughput MIC processors, GPG-PU's, accelerators (such as, e.g., graphics accelerators or digital signal processing (DSP) units), field programmable gate arrays, or any other processor, are coupled to first bus 1016. In one embodiment, second bus 1020 may be a low pin count (LPC) bus. Various devices may be coupled to a second bus 1020 including, for example, a keyboard and/or mouse 1022, communication devices 1027 and a storage unit 1028 such as a disk drive or other mass storage device which may include instructions/code and data 1030, in one embodiment. Further, an audio I/O 1024 may be coupled to the second bus 1020. Note that other architectures are possible. For example, instead of the point-to-point architecture of FIG. 10, a system may implement a multi-drop bus or other such architecture.

Figure 11:
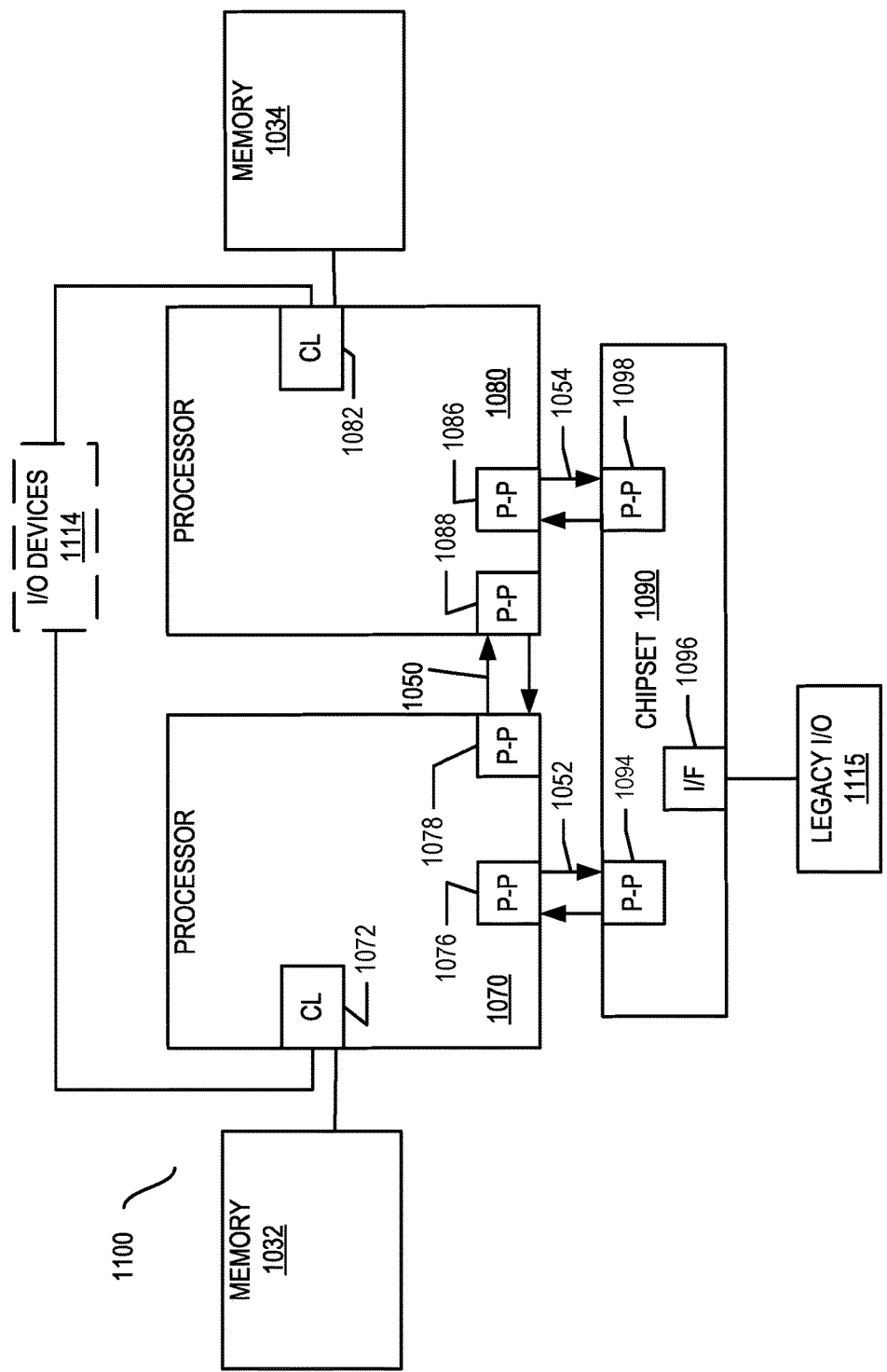

Referring now to FIG. 11, shown is a block diagram of a second more specific exemplary system 1100 in accordance with an embodiment of the present invention. Like elements in FIGS. 10 and 11 bear like reference numerals, and certain aspects of FIG. 10 have been omitted from FIG. 11 in order to avoid obscuring other aspects of FIG. 11.

FIG. 11 illustrates that the processors 1070, 1080 may include integrated memory and I/O control logic ("CL") 1072 and 1082, respectively. Thus, the CL 1072, 1082 include integrated memory controller units and include I/O control logic. FIG. 11 illustrates that not only are the memories 1032, 1034 coupled to the CL 1072, 1082, but also that I/O devices 1114 are also coupled to the control logic 1072, 1082. Legacy I/O devices 1115 are coupled to the chipset 1090.

Figure 12:
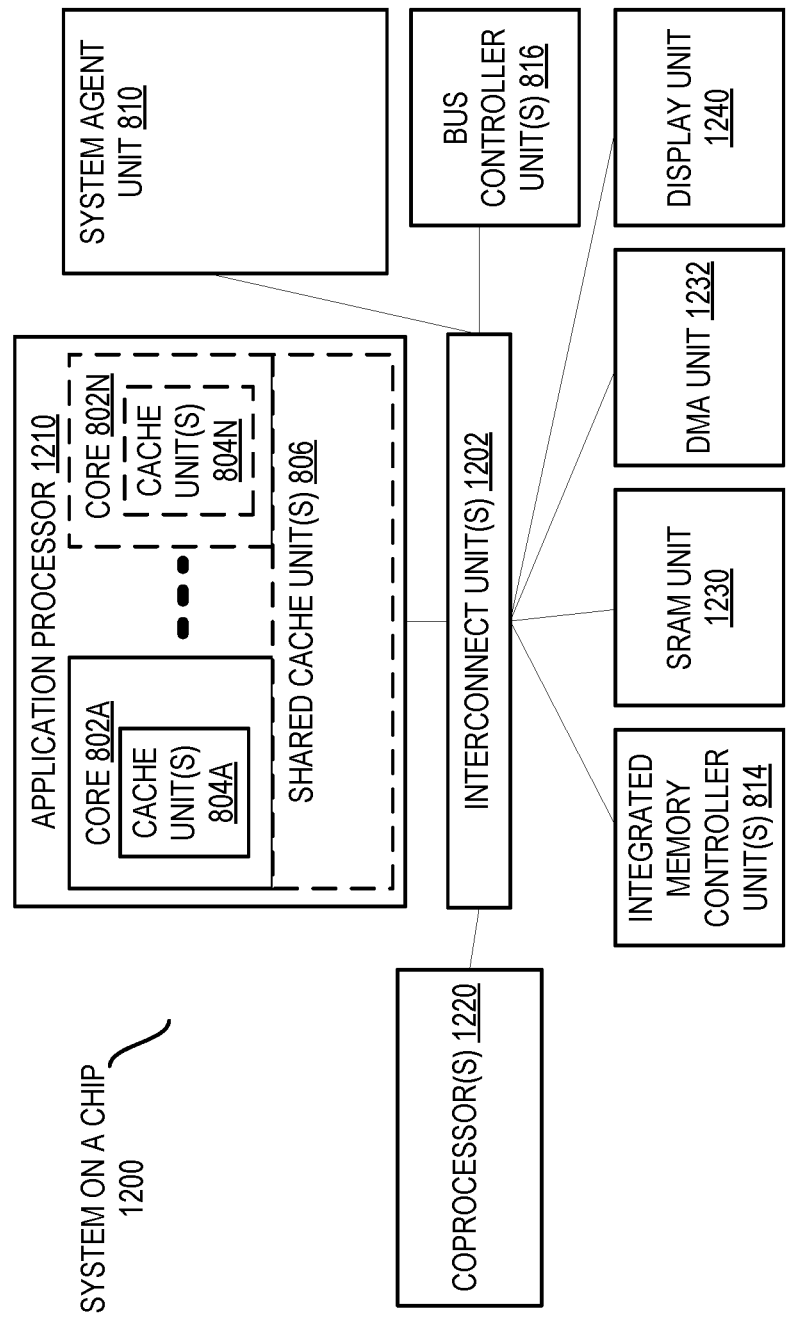

Referring now to FIG. 12, shown is a block diagram of a SoC 1200 in accordance with an embodiment of the present invention. Similar elements in FIG. 8 bear like reference numerals. Also, dashed lined boxes are optional features on more advanced SoCs. In FIG. 12, an interconnect unit(s) 1202 is coupled to: an application processor 1210 which includes a set of one or more cores 802A-N, which include cache units 804A-N, and shared cache unit(s) 806; a system agent unit 810; a bus controller unit(s) 816; an integrated memory controller unit(s) 814; a set or one or more coprocessors 1220 which may include integrated graphics logic, an image processor, an audio processor, and a video processor; an static random access memory (SRAM) unit 1230; a direct memory access (DMA) unit 1232; and a display unit 1240 for coupling to one or more external displays. In one embodiment, the coprocessor(s) 1220 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1030 illustrated in FIG. 10, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high-level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Further Examples

Example 1 provides a method for handling load faults in an out-of-order processor, the method comprising: detecting, by a memory ordering buffer of the out-of-order processor, a load fault corresponding to a load instruction that was executed out-of-order by the out-of-order processor; determining, by the memory ordering buffer, whether instant reclamation is available for resolving the load fault of the load instruction; and performing, in response to determining that instant reclamation is available for resolving the load fault of the load instruction, instant reclamation to re-fetch the load instruction for execution prior to attempting to retire the load instruction.

Example 2 includes the substance of the exemplary method of Example 1, wherein performing the instant reclamation comprises: determining a branch instruction preceding the load instruction in program order; and generating a reconstructed load address of the load instruction based on an address associated with the branch instruction and a set of address bits of the load instruction.

Example 3 includes the substance of the exemplary method of Example 2, wherein the address associated with the branch instruction is one of the address of the branch instruction in memory and a target of the branch instruction.

Example 4 includes the substance of the exemplary method of any one of Examples 2 and 3, wherein generating the reconstructed load address of the load instruction comprises: combining a set of upper bits of the branch address associated with the branch instruction with the set of address bits, such that the set of upper bits of the branch address associated with the branch instruction are upper bits of the reconstructed load address and the set of address bits are lower bits of the reconstructed load address.

Example 5 includes the substance of the exemplary method of any one of Examples 2-4, wherein performing the instant reclamation further comprises: generating, by a reservation station, an early instant reclamation request based on one or more of a reorder buffer identifier, a store buffer identifier, and a load buffer identifier associated with the load instruction; and transmitting the early instant reclamation request to a jump execution unit.

Example 6 includes the substance of the exemplary method of Example 5, wherein performing the instant reclamation further comprises: detecting, by the jump execution unit in response to the early instant reclamation request, whether a mis-predicted branch instruction that occurs before the load instruction in program order is being handled by the out-of-order processor; and transmitting, by the jump execution unit, a load clear to a front-end multiplexer to cause the front-end multiplexer to transmit the reconstructed load address, wherein re-fetching is performed starting from the reconstructed load address when the jump execution fails to detect a mis-predicted branch instruction that occurs before the load instruction in program order is being handled by the out-of-order processor.

Example 7 includes the substance of the exemplary method of any one of Examples 5 and 6, wherein the reorder buffer identifier, the store buffer identifier, and a load buffer identifier are stored within a load information table within one of the reservation station and the memory ordering buffer.

Example 8 includes the substance of the exemplary method of any one of Examples 3 and 4, wherein determining whether instant reclamation is available for resolving the load fault of the load instruction is based on a distance of the load instruction from the branch instruction preceding the load instruction in program order.

Example 9 includes the substance of the exemplary method of Example 8, wherein when the distance is less than a predetermined distance, the memory ordering buffer determines that instant reclamation is available for resolving the load fault of the load instruction.

Example 10 includes the substance of the exemplary method of any one of Examples 1-9, wherein the load fault is based on one of an external snoop hit, a memory disambiguation misprediction, and a memory renaming mismatch.

Example 11 provides instant reclamation system for an out-of-order processor, comprising: a memory ordering buffer to detect a load fault corresponding to a load instruction that was executed out-of-order; a reservation station to determine a branch instruction preceding the load instruction in program order; and a front-end multiplexer to output a reconstructed load address of the load instruction based on an address associated with the branch instruction preceding the load instruction, wherein the reconstructed load address is to be used to re-fetch instructions, including the load instruction, for execution prior to attempting to retire the load instruction.

Example 12 includes the substance of the exemplary instant reclamation system of Example 11, wherein the address associated with the branch instruction is one of the address of the branch instruction in memory and a target of the branch instruction.

Example 13 includes the substance of the exemplary instant reclamation system of any one of Examples 11 and 12, wherein the instant reclamation system further comprises: a combination unit to generate the reconstructed address of the load instruction based on the address associated with the branch instruction and a set of address bits of the load instruction.

Example 14 includes the substance of the exemplary instant reclamation system of Example 13, wherein the combination unit generates the reconstructed address of the load instruction by combining a set of upper bits of the address associated with the branch instruction with the set of address bits, such that the set of upper bits of the address associated with the branch instruction are upper bits of the reconstructed address and the set of address bits are lower bits of the reconstructed load address and the load instruction is fetched for execution based on the reconstructed load address.

Example 15 includes the substance of the exemplary instant reclamation system of any one of Examples 11-14, further comprising: a jump execution unit to: detect whether a mis-predicted branch instruction that occurs before the load instruction in program order is being handled by the out-of-order processor, and transmit a load clear to the front-end multiplexer to cause the front-end multiplexer to transmit the reconstructed load address, wherein re-fetching is performed starting from the reconstructed load address when the jump execution fails to detect a mis-predicted branch instruction that occurs before the load instruction in program order is being handled by the out-of-order processor.

Example 16 includes the substance of the exemplary instant reclamation system of Example 15, wherein the reservation station is to: generate an early instant reclamation request based on one or more of a reorder buffer identifier, a store buffer identifier, and a load buffer identifier associated with the load instruction.

Example 17 includes the substance of the exemplary instant reclamation system of Example 16, wherein the reservation station is to further: transmit the early instant reclamation request to the jump execution unit such that the jump execution unit may detect whether a mis-predicted branch instruction that occurs before the load instruction in program order is being handled by the out-of-order processor.

Example 18 includes the substance of the exemplary instant reclamation system of Example 17, wherein the memory ordering buffer is to determine whether instant reclamation is permitted for resolving the load fault of the load instruction, wherein instant reclamation is permitted for the load instruction when a distance between the load instruction and a preceding branch instruction in program order is less than a predetermined distance.

Example 19 includes the substance of the exemplary instant reclamation system of Examples 11-18, wherein the load fault is based on one of an external snoop hit, a memory disambiguation misprediction, and a memory renaming mismatch.

Example 20 provides a non-transitory machine-readable medium containing instructions that, when performed by an out-of-order processor, cause the performance of operations comprising: detecting a load fault corresponding to a load instruction that was executed out-of-order by the out-of-order processor; determining whether instant reclamation is available for resolving the load fault of the load instruction; and performing, in response to detecting determining that instant reclamation is available for resolving the load fault of the load instruction the load fault of the load instruction, instant reclamation to re-fetch and re-execute the load instruction for execution prior to attempting to retire the load instruction.

Example 21 includes the substance of the exemplary non-transitory machine-readable medium of Example 20, wherein performing the instant reclamation comprises: determining a branch instruction preceding the load instruction in program order; and generating a reconstructed load address of the load instruction based on an address associated with the branch instruction and a set of address bits of the load instruction, wherein the address associated with the branch instruction is one of the address of the branch instruction in memory and a target of the branch instruction.

Example 22 includes the substance of the exemplary non-transitory machine-readable medium of any one of Examples 20 and 21, wherein generating the reconstructed load address of the load instruction comprises: combining a set of upper bits of the branch address associated with the branch instruction with the set of address bits, such that the set of upper bits of the branch address associated with the branch instruction are upper bits of the reconstructed load address and the set of address bits are lower bits of the reconstructed load address.

Example 23 includes the substance of the exemplary non-transitory machine-readable medium of any one of Examples 21 and 22, wherein performing the instant reclamation further comprises: generating an early instant reclamation request based on one or more of a reorder buffer identifier, a store buffer identifier, and a load buffer identifier associated with the load instruction; detecting, in response to the early instant reclamation request, whether a mis-predicted branch instruction that occurs before the load instruction in program order is being handled by the out-of-order processor; and transmitting a load clear to a front-end multiplexer to cause the front-end multiplexer to transmit the reconstructed load address, wherein re-fetching is performed starting from the reconstructed load address when the jump execution fails to detect a mis-predicted branch instruction that occurs before the load instruction in program order is being handled by the out-of-order processor.

Example 24 includes the substance of the exemplary non-transitory machine-readable medium of Example 23, wherein the reorder buffer identifier, the store buffer identifier, and a load buffer identifier are stored within a load information table within one of a reservation station and a memory ordering buffer.

Example 25 includes the substance of the exemplary non-transitory machine-readable medium of Example 20, wherein determining whether instant reclamation is available for resolving the load fault of the load instruction is based on a distance of the load instruction from the branch instruction preceding the load instruction in program order, and wherein when the distance is less than a predetermined distance instant reclamation is determined to be available for resolving the load fault of the load instruction.

Example 26 provides an out-of-order processor comprising: a means for detecting a load fault corresponding to a load instruction that was executed out-of-order by the out-of-order processor; a means for determining whether instant reclamation is available for resolving the load fault of the load instruction; and a means for performing, in response to determining that instant reclamation is available for resolving the load fault of the load instruction, instant reclamation to re-fetch the load instruction for execution prior to attempting to retire the load instruction.

Example 27 includes the substance of the exemplary out-of-order processor of Example 26, wherein the means for performing the instant reclamation comprises: a means for determining a branch instruction preceding the load instruction in program order; and a means for generating a reconstructed load address of the load instruction based on an address associated with the branch instruction and a set of address bits of the load instruction.

Example 28 includes the substance of the exemplary out-of-order processor of Example 27, wherein the address associated with the branch instruction is one of the address of the branch instruction in memory and a target of the branch instruction.

Example 29 includes the substance of the exemplary out-of-order processor of any one of Examples 27 and 28, wherein the means for generating the reconstructed load address of the load instruction comprises: a means for combining a set of upper bits of the branch address associated with the branch instruction with the set of address bits, such that the set of upper bits of the branch address associated with the branch instruction are upper bits of the reconstructed load address and the set of address bits are lower bits of the reconstructed load address.

Example 30 includes the substance of the exemplary out-of-order processor of any one of Examples 27-29, wherein the means for performing the instant reclamation further comprises: a means for generating an early instant reclamation request based on one or more of a reorder buffer identifier, a store buffer identifier, and a load buffer identifier associated with the load instruction; and a means for transmitting the early instant reclamation request to a jump execution unit.

Example 31 includes the substance of the exemplary out-of-order processor of Example 30, wherein the means for performing the instant reclamation further comprises: a means for detecting, in response to the early instant reclamation request, whether a mis-predicted branch instruction that occurs before the load instruction in program order is being handled by the out-of-order processor; and a means for transmitting a load clear to a front-end multiplexer to cause the front-end multiplexer to transmit the reconstructed load address, wherein re-fetching is performed starting from the reconstructed load address when the jump execution fails to detect a mis-predicted branch instruction that occurs before the load instruction in program order is being handled by the out-of-order processor.

Example 32 includes the substance of the exemplary out-of-order processor of any one of Examples 30 and 31, wherein the reorder buffer identifier, the store buffer identifier, and a load buffer identifier are stored within a load information table within one of a reservation station and a memory ordering buffer.

Example 33 includes the substance of the exemplary out-of-order processor of any one of Examples 28 and 29, wherein determining whether instant reclamation is available for resolving the load fault of the load instruction is based on a distance of the load instruction from the branch instruction preceding the load instruction in program order.

Example 34 includes the substance of the exemplary out-of-order processor of Example 33, wherein when the distance is less than a predetermined distance, instant reclamation is determined to be available for resolving the load fault of the load instruction.

Example 35 includes the substance of the exemplary out-of-order processor of any one of Examples 26-34, wherein the load fault is based on one of an external snoop hit, a memory disambiguation misprediction, and a memory renaming mismatch.

What is claimed is:

1. A method for handling load faults in an out-of-order processor, the method comprising:
    detecting, by a memory ordering buffer of the out-of-order processor, a load fault corresponding to a load instruction that was executed out-of-order by the out-of-order processor;
    determining, by the memory ordering buffer, whether instant reclamation is available for resolving the load fault of the load instruction; and
    performing, in response to determining that instant reclamation is available for resolving the load fault of the load instruction, instant reclamation to re-fetch the load instruction for execution prior to attempting to retire the load instruction.

2. The method of claim 1, wherein performing the instant reclamation comprises:
    determining a branch instruction preceding the load instruction in program order; and
    generating a reconstructed load address of the load instruction based on an address associated with the branch instruction and a set of address bits of the load instruction,
    wherein the address associated with the branch instruction is one of the address of the branch instruction in memory and a target of the branch instruction.

3. The method of claim 2, wherein generating the reconstructed load address of the load instruction comprises:
    combining a set of upper bits of the branch address associated with the branch instruction with the set of address bits, such that the set of upper bits of the branch address associated with the branch instruction are upper bits of the reconstructed load address and the set of address bits are lower bits of the reconstructed load address.

4. The method of claim 2, wherein performing the instant reclamation further comprises:
    generating, by a reservation station, an early instant reclamation request based on one or more of a reorder buffer identifier, a store buffer identifier, and a load buffer identifier associated with the load instruction;
    transmitting the early instant reclamation request to a jump execution unit;
    detecting, by the jump execution unit in response to the early instant reclamation request, whether a mis-predicted branch instruction that occurs before the load instruction in program order is being handled by the out-of-order processor; and
    transmitting, by the jump execution unit, a load clear to a front-end multiplexer to cause the front-end multiplexer to transmit the reconstructed load address, wherein re-fetching is performed starting from the reconstructed load address when the jump execution fails to detect a mis-predicted branch instruction that occurs before the load instruction in program order is being handled by the out-of-order processor.

5. The method of claim 4, wherein the reorder buffer identifier, the store buffer identifier, and a load buffer identifier are stored within a load information table within one of the reservation station and the memory ordering buffer.

6. The method of claim 2, wherein determining whether instant reclamation is available for resolving the load fault of the load instruction is based on a distance of the load instruction from the branch instruction preceding the load instruction in program order, and
    wherein when the distance is less than a predetermined distance, the memory ordering buffer determines that instant reclamation is available for resolving the load fault of the load instruction.

7. The method of claim 1, wherein the load fault is based on one of an external snoop hit, a memory disambiguation misprediction, and a memory renaming mismatch.

8. An instant reclamation system for an out-of-order processor, comprising:
    a memory ordering buffer to detect a load fault corresponding to a load instruction that was executed out-of-order;
    a reservation station to determine a branch instruction preceding the load instruction in program order; and
    a front-end multiplexer to output a reconstructed load address of the load instruction based on an address associated with the branch instruction preceding the load instruction, wherein the reconstructed load address is to be used to re-fetch instructions, including the load instruction, for execution prior to attempting to retire the load instruction.

9. The instant reclamation system of claim 8, wherein the address associated with the branch instruction is one of the address of the branch instruction in memory and a target of the branch instruction.

10. The instant reclamation system of claim 9, wherein the instant reclamation system further comprises:
    a combination unit to generate the reconstructed address of the load instruction based on the address associated with the branch instruction and a set of address bits of the load instruction,
    wherein the combination unit generates the reconstructed address of the load instruction by combining a set of upper bits of the address associated with the branch instruction with the set of address bits, such that the set of upper bits of the address associated with the branch instruction are upper bits of the reconstructed address and the set of address bits are lower bits of the reconstructed load address and the load instruction is fetched for execution based on the reconstructed load address.

11. The instant reclamation system of claim 8, further comprising:
    a jump execution unit to:
        detect whether a mis-predicted branch instruction that occurs before the load instruction in program order is being handled by the out-of-order processor, and transmit a load clear to the front-end multiplexer to cause the front-end multiplexer to transmit the reconstructed load address, wherein re-fetching is performed starting from the reconstructed load address when the jump execution fails to detect a mis-predicted branch instruction that occurs before the load instruction in program order is being handled by the out-of-order processor.

12. The instant reclamation system of claim 11, wherein the reservation station is to:
generate an early instant reclamation request based on one or more of a reorder buffer identifier, a store buffer identifier, and a load buffer identifier associated with the load instruction; and
transmit the early instant reclamation request to the jump execution unit such that the jump execution unit may detect whether a mis-predicted branch instruction that occurs before the load instruction in program order is being handled by the out-of-order processor.

13. The instant reclamation system of claim 12, wherein the memory ordering buffer is to determine whether instant reclamation is permitted for resolving the load fault of the load instruction, wherein instant reclamation is permitted for the load instruction when a distance between the load instruction and a preceding branch instruction in program order is less than a predetermined distance.

14. The instant reclamation system of claim 8, wherein the load fault is based on one of an external snoop hit, a memory disambiguation misprediction, and a memory renaming mismatch.

15. A non-transitory machine-readable medium containing instructions that, when performed by an out-of-order processor, cause the performance of operations comprising:
detecting a load fault corresponding to a load instruction that was executed out-of-order by the out-of-order processor;
determining whether instant reclamation is available for resolving the load fault of the load instruction; and
performing, in response to detecting determining that instant reclamation is available for resolving the load fault of the load instruction the load fault of the load instruction, instant reclamation to re-fetch and re-execute the load instruction for execution prior to attempting to retire the load instruction.

16. The non-transitory machine-readable medium of claim 15, wherein performing the instant reclamation comprises:
determining a branch instruction preceding the load instruction in program order; and
generating a reconstructed load address of the load instruction based on an address associated with the branch instruction and a set of address bits of the load instruction,
wherein the address associated with the branch instruction is one of the address of the branch instruction in memory and a target of the branch instruction.

17. The non-transitory machine-readable medium of claim 16, wherein generating the reconstructed load address of the load instruction comprises:
combining a set of upper bits of the branch address associated with the branch instruction with the set of address bits, such that the set of upper bits of the branch address associated with the branch instruction are upper bits of the reconstructed load address and the set of address bits are lower bits of the reconstructed load address.

18. The non-transitory machine-readable medium of claim 16, wherein performing the instant reclamation further comprises:
generating an early instant reclamation request based on one or more of a reorder buffer identifier, a store buffer identifier, and a load buffer identifier associated with the load instruction;
detecting, in response to the early instant reclamation request, whether a mis-predicted branch instruction that occurs before the load instruction in program order is being handled by the out-of-order processor; and
transmitting a load clear to a front-end multiplexer to cause the front-end multiplexer to transmit the reconstructed load address, wherein re-fetching is performed starting from the reconstructed load address when the jump execution fails to detect a mis-predicted branch instruction that occurs before the load instruction in program order is being handled by the out-of-order processor.

19. The non-transitory machine-readable medium of claim 18, wherein the reorder buffer identifier, the store buffer identifier, and a load buffer identifier are stored within a load information table within one of a reservation station and a memory ordering buffer.

20. The non-transitory machine-readable medium of claim 16, wherein determining whether instant reclamation is available for resolving the load fault of the load instruction is based on a distance of the load instruction from the branch instruction preceding the load instruction in program order, and
wherein when the distance is less than a predetermined distance instant reclamation is determined to be available for resolving the load fault of the load instruction.

* * * * *